United States Patent
Dong et al.

(10) Patent No.: US 7,677,371 B2
(45) Date of Patent: Mar. 16, 2010

(54) MOWER WITH AUTOMATIC PARKING BRAKE

(75) Inventors: Xingen Dong, Farmington, CT (US); Barun Acharya, Johnson City, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 398 days.

(21) Appl. No.: 11/563,135

(22) Filed: Nov. 24, 2006

(65) Prior Publication Data
US 2007/0125054 A1    Jun. 7, 2007

Related U.S. Application Data

(60) Provisional application No. 60/739,810, filed on Nov. 23, 2005.

(51) Int. Cl.
    *B60T 11/00*    (2006.01)
(52) U.S. Cl. .............................. 188/350; 303/3; 56/11.3
(58) Field of Classification Search .................. 56/10.9, 56/11.3, 11.9; 188/151 R, 350; 303/3, 10, 303/11, 158
    See application file for complete search history.

(56) References Cited

U.S. PATENT DOCUMENTS

| | | | |
|---|---|---|---|
| 4,451,095 A * | 5/1984 | Chichester et al. ............ 303/71 |
| 4,565,265 A * | 1/1986 | Woolley ..................... 188/72.6 |
| 5,203,616 A | 4/1993 | Johnson | |
| 5,529,134 A | 6/1996 | Yomogita | |
| 5,599,073 A | 2/1997 | Huh | |
| 5,919,243 A | 7/1999 | Huh | |
| 6,056,074 A | 5/2000 | Heal et al. | |
| 6,729,115 B2 * | 5/2004 | Bartel ......................... 56/11.3 |
| 2003/0070429 A1 | 4/2003 | Jolliff et al. | |

FOREIGN PATENT DOCUMENTS

KR    2002047928 A  *  6/2002

* cited by examiner

*Primary Examiner*—Alicia M Torres
(74) *Attorney, Agent, or Firm*—Renner, Otto, Boisselle & Sklar, LLP

(57) ABSTRACT

A normally engaged parking brake system for a mower that automatically disengages a parking brake when a steering arm is moved from a park position. Accordingly, the operator does not need to act to set or release the parking brake during normal operation. The system utilizes a hydraulic actuator that releases the parking brake when pressurized fluid is supplied thereto from a hydraulic pump of the mower. A manual pump, which can be configured to be operated by moving a steering arm of the mower, is provided for supplying pressurized fluid to the hydraulic actuator to release to brake in the event the hydraulic pump is not operating.

17 Claims, 2 Drawing Sheets

MOWER WITH AUTOMATIC PARKING BRAKE

RELATED APPLICATIONS

This application claims the benefit of U.S. Provisional Application No. 60/739,810 filed Nov. 23, 2005, which is hereby incorporated by reference.

FIELD OF THE INVENTION

The present invention relates generally to brake systems. More particularly, the invention relates to parking brake systems for mowers.

BACKGROUND OF THE INVENTION

Hydrostatic transmissions have many uses, including the propelling of vehicles, such as mowing machines, and offer a stepless control of the machine's speed. A typical hydrostatic transmission system includes a variable displacement main hydraulic pump connected in a closed hydraulic circuit with a fixed displacement hydraulic motor. The closed hydraulic circuit includes a first conduit connecting the main pump outlet with the motor inlet and a second conduit connecting the motor outlet with a pump inlet. Either of these conduits may be the high pressure line depending upon the direction of pump displacement from neutral. For most applications, the pump is driven by a prime mover, such as an internal combustion engine or an electrical motor, at a certain speed in a certain direction. Changing the displacement of the main pump will change its output flow rate, which controls the speed of the motor. Pump outflow can be reversed, thus reversing the direction of the motor. In a vehicle, the motor is typically connected through suitable gearing to the vehicle's wheels or tracks.

In some vehicles, such as zero-turn-radius mowers, separate hydraulic pumps and motors are used to independently drive separate wheels of an axle. By independently driving the wheels in opposite directions, for example, the vehicle can be made to turn with zero radius. Zero-turn-radius mowers are increasingly popular as the size and costs of such mowers decrease.

Movement of some zero-turn-radius mowers is controlled by a pair of steering arms connected to each hydraulic pump. By moving the steering arms, an operator can control the pump flow displacement and direction of each pump and, thus, the speed and direction of rotation of each rear wheel. Accordingly, the operator can both steer the mower and control the speed of the mower by manipulating the steering control arms.

Mowers often are equipped with parking brakes that can be activated by an operator to secure the wheels against rotation when the vehicle is parked. Such parking brakes are typically normally disengaged, and are engaged upon activation by the operator. Thus, if the operator forgets to activate the parking brake, the mower could potentially roll if on uneven ground.

SUMMARY OF THE INVENTION

The present invention provides a normally engaged parking brake system for a mower that automatically disengages a parking brake when a steering arm is moved from a park position. Accordingly, the operator does not need to act to set or release the parking brake during normal operation. The system utilizes a hydraulic actuator that releases the parking brake when pressurized fluid is supplied thereto from a hydraulic pump of the mower. A manual pump, which can be configured to be operated by moving a steering arm of the mower, is provided for supplying pressurized fluid to the hydraulic actuator to release the brake in the event the hydraulic pump is not operating.

Accordingly, a parking brake system for a mower having a hydrostatic transmission comprises a normally engaged parking brake connectable to a wheel of the vehicle for braking rotation thereof, and a hydraulic parking brake actuator connectable to a hydraulic pump driven by a motor of the vehicle and configured to disengage the parking brake when high pressure fluid is supplied thereto. A valve is operable to cause high pressure fluid to flow to or from the actuator, and a sensor is configured for sensing a position of a steering lever of the mower corresponding to a park position. The sensor is connected to the valve and controls the valve so as to cause high pressure fluid to flow to the actuator to disengage the parking brake when the sensor senses the steering lever is not in the park position. A manual pump, which may be a plunger pump, is connectable to the steering lever of the vehicle and configured to supply pressurized fluid to the hydraulic actuator. The manual pump and the sensor can be provided in a common housing mountable to the frame as a unit.

More particularly, the sensor includes a switch having a first position and a second position. The switch is configured to move between the first position and the second position in response to movement of the steering lever from the park position. The parking brake member can be a drum brake, a disk brake, or a cam brake.

According to another aspect of the invention, a mower comprises a frame, a wheel mounted to the frame for supporting the mower for movement over a surface, a steering control lever for controlling rotation of the wheel, the lever movable between a plurality of positions including a park position. A normally engaged parking brake member is configured to brake the wheel and an actuator is configured to disengage the parking brake member when pressurized fluid is supplied thereto. A valve is operable to cause high pressure fluid to flow to or from the actuator, and a sensor senses when the steering control lever is in a park position. The sensor is connected to the valve and controls the valve so as to cause high pressure fluid to flow to the actuator to disengage the parking brake when the sensor senses the steering lever is not in the park position.

More particularly, the steering control lever is movable between a forward position, a reverse position and a park position, and movement of the steering control lever is constrained by a T-shape opening through which the steering lever extends. The T-shape opening has a leg portion, and the steering lever is configured such that is in the park position when the steering lever is in a portion of the leg portion of the T-shape opening. A manual pump connectable to the steering lever of the vehicle can be configured to supply pressurized fluid to the hydraulic actuator. The manual pump can be configured to be operated by the steering control lever when the steering control lever is moved within the T-shape opening, for example between park and neutral positions.

The sensor can be a switch having a first position and a second position, and the sensor can be configured such that the first position or second position is associated with the steering control lever being in the park position. The actuator can be a hydraulic actuator coupled to a hydraulic circuit of the mower and configured to disengage the parking brake member when pressurized fluid is supplied thereto.

Further features of the invention will become apparent from the following detailed description when considered in conjunction with the drawings.

DETAILED DESCRIPTION

Figure 1:
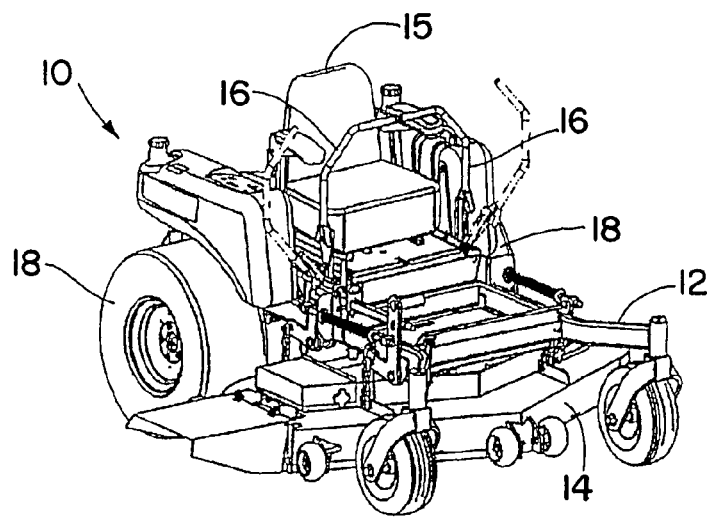
FIG. 1 is an exemplary zero-turn-radius mower employing a parking brake system in accordance with the invention.

Referring now to the drawings in detail, and initially to FIG. 1, an exemplary zero-turn-radius mower 10 is illustrated. The mower 10 includes a frame 12, a mower deck 14 supported by the frame 12 for mowing grass, an operator seat 15, and steering control levers 16 for operating the mower 10. A rear mounted engine is mounted to the frame 12 behind the seat 15 and provides power to first and second hydrostatic transmissions (motor and hydrostatic transmissions not shown in FIG. 1) also mounted to the frame 12. The first and second hydrostatic transmission are each coupled to respective rear wheels 18 which are the drive wheels in the illustrated embodiment. The steering levers 16 are configured to rotate a trunnion or other control member on a respective hydrostatic transmission for controlling pump output and direction. Thus, the hydrostatic transmissions can be controlled by an operator to independently drive respective rear wheels 18 to propel the mower and provide zero-turn-radius functionality. The design of the illustrated mower 10 is merely exemplary in nature, and it will be appreciated that other mower designs and vehicle types can be used in accordance with the invention.

Figure 2:
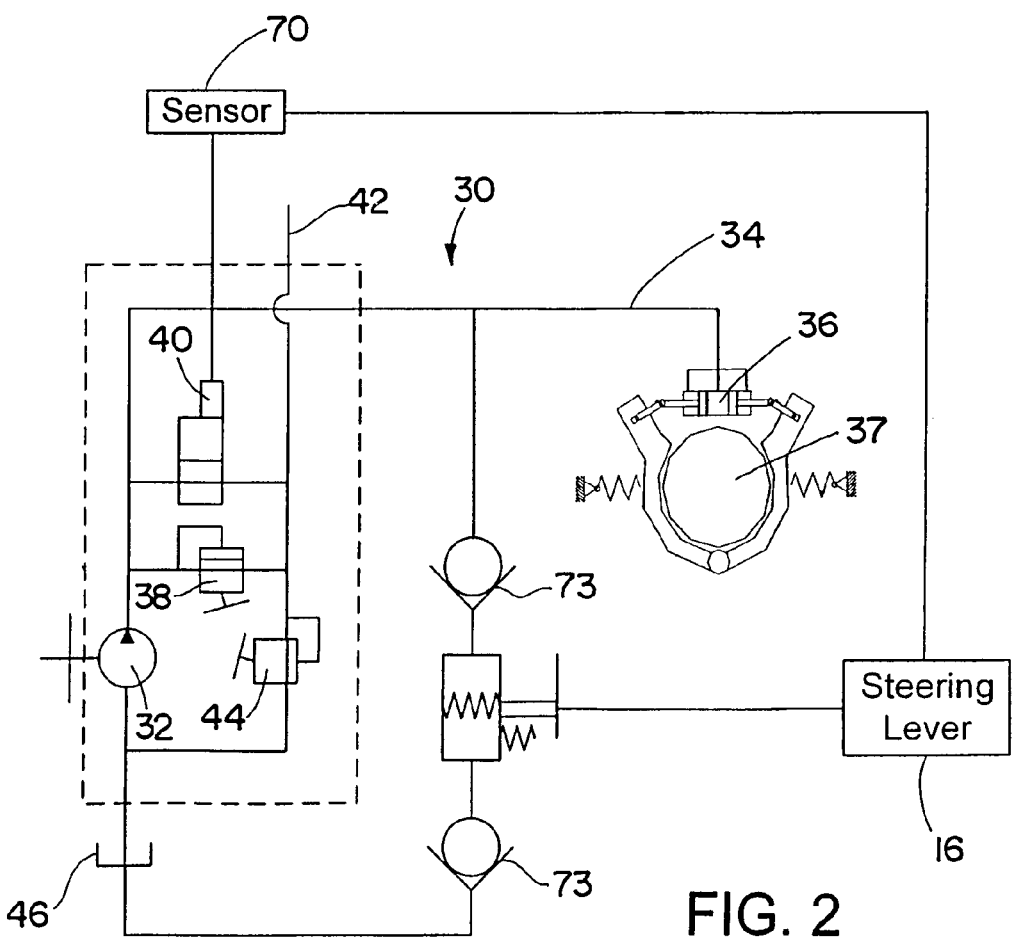
FIG. 2 is a schematic diagram of an exemplary hydraulic circuit in accordance with the invention.

Turning to FIG. 2, an exemplary hydraulic circuit 30 for actuating a parking brake in accordance with the invention is illustrated. The illustrated hydraulic circuit 30 is a charge circuit that also provides makeup flow to a closed loop of a hydrostatic transmission. It will be appreciated that the exemplary hydraulic circuit 30 could be an auxiliary hydraulic circuit, for example, or any other suitable circuit. It will be appreciated that a separate circuit 30 can be and usually would be provided for each drive wheel of the vehicle.

The circuit 30 includes a pump 32 and a pump discharge line 34 connected to a brake actuator 36 for supplying pressurized fluid thereto. The brake actuator 36 is configured to disengage a normally engaged parking brake assembly 37 when high pressure fluid is supplied thereto.

A high pressure relief valve 38 and a bypass valve 40 are connected in parallel between the discharge line 34 and a makeup flow supply line 42. The makeup flow supply line 42 supplies makeup flow to a closed loop of a hydrostatic transmission (not shown). A low pressure relief valve 44 permits flow from the makeup flow supply line 42 to a sump 46.

It will be appreciated that the bypass valve 40 between the discharge line 34 and the makeup flow supply line 42 can be selectively actuated to bypass flow around the high pressure relief valve 38 from the discharge line 34 to the makeup flow supply line 42. Accordingly, when the bypass valve 40 is closed, the maximum pressure in the discharge line 34 is generally controlled by the high pressure relief valve 38. When the bypass valve 40 is open, the maximum pressure in the discharge line is generally controlled by the low pressure relief valve 44. It will be appreciated that although there will be some pressure in the discharge line 34 when the bypass valve 40 is open, the pressure is generally not sufficient to overcome the bias of the parking brake assembly 37. Accordingly, when the bypass valve 40 is open the parking brake assembly 37 will be engaged.

As will be described in more detail below, the bypass valve 40 is configured to be controlled in response to a signal received from a sensor that senses a position of a steering control lever, such as one of the steering control levers 16 in FIG. 1. When the bypass valve is closed, high pressure fluid is supplied to the brake actuator 36 and the parking brake assembly 37 is disengaged. When the bypass valve 40 is open, high pressure fluid is not supplied to the brake actuator 36 and the parking brake assembly 37 is engaged.

Figure 3:
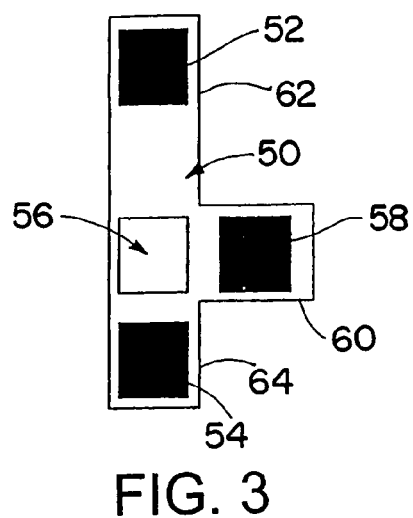
FIG. 3 is a top view of a T-shape slot through which a control arm of the mower of FIG. 1 extends.
Figure 4:
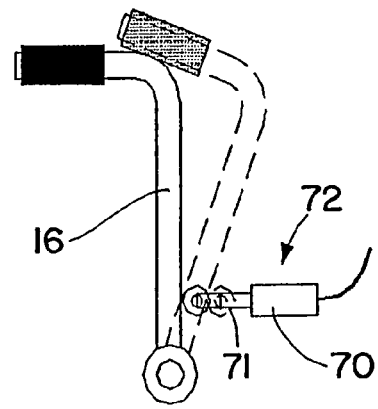
FIG. 4 is a front view of one of the control arms of the mower of FIG. 1.

Turning to FIGS. 3 and 4, the steering control lever 16 and sensor 70 arrangement will be described. FIG. 3 illustrates a T-shape opening 50 through which the steering control lever 16 extends. The T-shape opening in FIG. 3 is for the right side steering control lever 16 and constrains movement of the steering lever 16 passing therethrough. The T-shape opening 50 has a leg (or stem) portion 60, a forward portion 62 extending forwardly from one end of the stem portion 60 and a rearward portion 64 extending rearwardly from the same end of the leg portion 60. The T-shape opening 50 can be formed in a frame member of the mower 10, or a body member, for example.

Four positions of the steering lever 16 are illustrated: a full speed forward position 52, a full speed reverse position 54, a neutral position 56, and a park position 58. Neutral position 56 corresponds to a neutral position of the associated hydrostatic transmission whereat no power is transmitted to the wheel connected to the hydrostatic transmission. Park position 58 also corresponds to the neutral position of the hydrostatic transmission, except that steering lever 16 has been shifted outward into the leg portion 60 of the T-shape opening 50. In the park position 58, forward and reverse movement of the steering control lever 16 is restricted. It will be appreciated that openings of other shapes can be used. For example, a straight slot could be used.

In FIG. 4, a sensor 70 is provided for sensing a position of the steering control lever 16. In the illustrated example, the sensor 70 is configured to sense when the steering control lever 16 is either in the neutral position 56 or the park position 58 (steering lever 16 shown in phantom in the park position in FIG. 4). In this regard, the sensor 70 can be a plunger-type electrical switch as illustrated that is in an "on" state (e.g., closed circuit) when a plunger 71 is depressed (e.g., when the steering control lever is in the park position 38), and in an "off" state when the plunger 71 is not depressed (e.g., when the steering control lever is not in the park position 38). The plunger 71 is biased against the steering lever 16 to maintain contact therewith. Other types of sensors can be used, such as linear variable displacement transducers (LVDTs), for example.

The sensor 70 sends a signal to the bypass valve 40 depending on the position of the steering control lever 16. For example, when the steering control lever 16 is in the park position 58, the sensor 70 signals the bypass valve 40 to open, thereby relieving pressure from the discharge line 34 and engaging the parking brake assembly 37. When the steering control lever 16 is not in the park position 58, the sensor 70 signals the bypass valve 40 to close, thereby supplying high pressure fluid to the discharge line 34 and disengaging the parking brake 37.

It will be appreciated that the bypass valve 40 can be configured to respond to both the presence of a signal received from the sensor 70 and the absence of a signal received from the sensor 70. Alternatively, the bypass valve 40 can be biased open (or closed) and configured to close (or open) in response to receiving a signal from the sensor 70. A manual override can be provided for manually opening and/or closing the bypass valve 40.

It will be appreciated that the bypass valve 40 can be configured in a variety ways. For example, the bypass valve 40 can be biased open (brake engaged), and configured to close (brake disengaged) in the presence of an electrical signal from the sensor 70. Alternatively, the bypass valve 40 can be biased closed (brake disengaged) and configured to open (brake engaged) in response to an electrical signal from the sensor 70. Thus, it will be appreciated that in some applications the parking brake assembly will be engaged when the pump 32 is not operating and/or in the absence of a signal from the sensor 70.

To disengage the parking brake 37 when pump 32 is not operating (e.g., for towing a disabled mower), a manual pump 72 is provided for supplying pressurized fluid to the actuator 36. The manual pump 72 pumps fluid from the sump 46, or other suitable source to the pump discharge line 34. The manual pump 72 can be a simple plunger pump with check valves 73 for maintaining one way flow through the pump 72.

The manual pump 72 can be provided adjacent to a steering control lever 16 of the mower 10 and can be connectable thereto so that movement of the steering control lever 16 results in movement of the manual pump 72 and pressurization of the discharge line 34. For example, the manual pump 72 can be releasably connectable to a lower end of the steering control member 16 above the pivot point of the steering control member 16 such that movement of the steering control member 16 between the park position 38 and the neutral position 36 results in pumping of fluid to discharge line 34. As mentioned, the bypass valve 40 can be provided with a manual override for closing the bypass valve (if necessary) to allow high pressure to be supplied to the actuator 36.

With reference to FIG. 4, it will be appreciated that the manual plunger pump 72 and sensor 70 can be provided in a common unit wherein the plunger 71 of the sensor, for example, is also a plunger of the manual pump 72. The combined plunger 71 can be provided with a hook or other means for releasable connection to the steering member 16 for reciprocating movement therewith.

Figure 5:
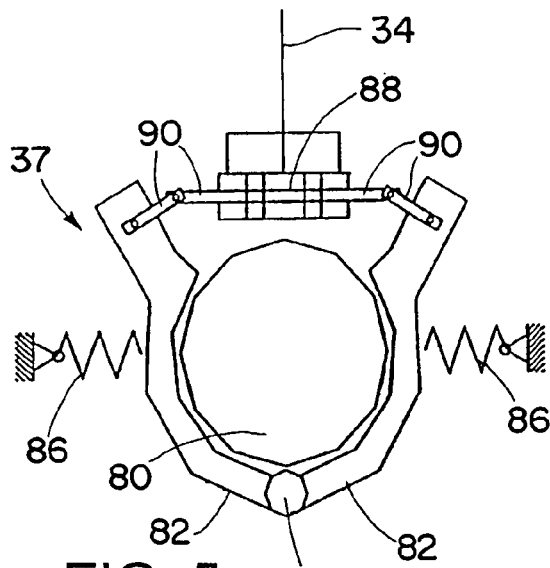
FIG. 5 is a schematic view of an exemplary normally engaged parking brake assembly.

Turning to FIG. 5, the parking brake assembly 37 will be described. The parking brake assembly 37 includes a drum 80 fixable to a wheel for rotation therewith, brake shoes 82 mounted to a pivot 84 for engagement with the drum 80, and springs 86 for biasing the brake shoes 82 into engagement with the drum 80. Connected to the parking brake assembly 37 is a double piston assembly 88 (actuator) connected via push rods 90 to brake shoes 82 for disengaging the brake shoes 82 from the brake drum 80 when pressurized fluid is supplied thereto via discharge line 34, as described above.

As mentioned, the parking brake assembly 37 is normally engaged and, accordingly, disengaging the parking brake 37 when pump 32 is not operating for the purposes of towing may be necessary. The manual pump 72 described above is one way in which the parking brake assembly 37 can be disengaged. Alternatively, a manual brake release can be provided.

Figure 6:
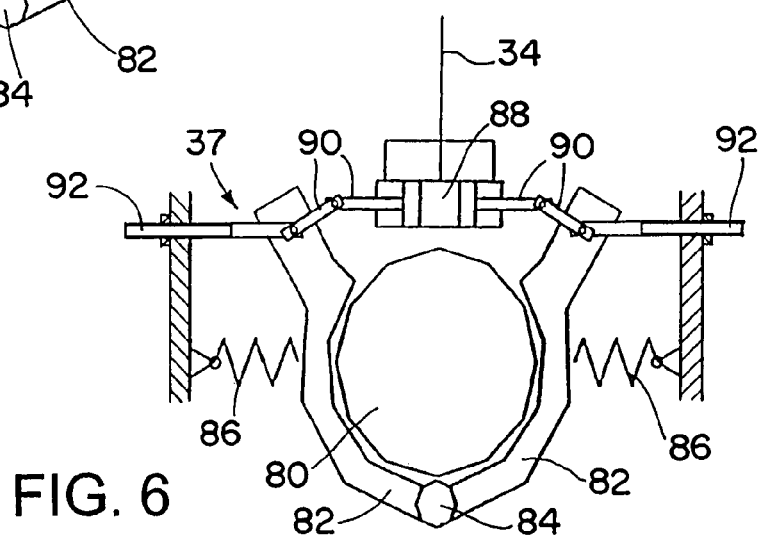
FIG. 6 is a schematic view of the parking brake assembly of FIG. 5 including a manual release mechanism.

Turning to FIG. 6, the parking brake 37 of FIG. 5 is illustrated with manual parking brake release mechanisms 92 attached to the brake shoes 82. The release mechanisms 92 are configured to disengage the shoes 82 from the drum 80 when pulled. Accordingly, handles and/or cam mechanisms (not shown) can be provided on the distal ends of the release mechanisms 92 for assisting in pulling. Alternatively, the release mechanisms 92 can be releasably connected to a steering control arm 16 such that movement of the steering control arm 16 results in disengaging the brake shoes 82 from the drum 80. In this regard, it will be appreciated that a mechanical advantage can be achieved by connecting the release mechanisms 92 to a lower portion of a steering control arm 16.

It will be appreciated that a wide variety of types of brakes can be used. Further, it will be appreciated that the hydraulic circuit 30 can be part of a hydrostatic transmission, or can be a separate auxiliary circuit of a vehicle.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A parking brake system for a mower having a hydrostatic transmission comprising:
    a normally engaged parking brake connectable to a wheel of the vehicle for braking rotation thereof;
    a hydraulic parking brake actuator connectable to a hydraulic pump of the vehicle and configured to disengage the parking brake when pressurized fluid is supplied thereto;
    a valve operable to cause high pressure fluid to flow to or from the actuator; and
    a sensor configured for sensing a position of a steering lever of the mower corresponding to a park position;
    wherein the sensor is connected to the valve and controls the valve so as to cause high pressure fluid to flow to the actuator to disengage the parking brake when the sensor senses the steering lever is not in the park position.

2. A parking brake system as set forth in claim 1, further comprising a manual pump connectable to the steering lever of the vehicle and configured to supply pressurized fluid to the hydraulic actuator in response to movement of the steering lever.

3. A parking brake system as set forth in claim 2, wherein the manual pump and sensor are included in a housing mountable to the mower as a unit.

4. A parking brake system as set forth in claim 2, wherein the manual pump is a plunger pump.

5. A parking brake system as set forth in claim 1, wherein the sensor includes a switch having a first position and a second position, the switch being configured to move between the first position and the second position in response to movement of the steering lever from the park position.

6. A parking brake system as set forth in claim 1, wherein the parking brake member is one of a drum brake, a disk brake, and a cam brake.

7. A mower comprising a frame, wheels mounted to the frame for supporting the mower for movement over the ground, and the parking brake system set forth in claim 1.

8. A mower comprising:
a frame;
a wheel mounted to the frame for supporting the mower for movement over a surface;
a steering control lever for controlling rotation of the wheel, the lever movable between a plurality of positions including a park position;
a normally engaged parking brake member configured to brake the wheel;
an actuator configured to disengage the parking brake member when pressurized fluid is supplied thereto;
a valve operable to cause high pressure fluid to flow to or from the actuator; and
a sensor for sensing when the steering control lever is in a park position;
wherein the sensor is connected to the valve and controls the valve so as to cause high pressure fluid to flow to the actuator to disengage the parking brake when the sensor senses the steering lever is not in the park position.

9. A mower as set forth in claim 8, wherein the steering control lever is movable between a forward position, a reverse position and a park position.

10. A mower as set forth in claim 9, wherein movement of the steering control lever is constrained by a T-shape opening through which the steering lever extends, the T-shape opening having a leg portion and the steering lever being configured such that it is in the park position when the steering lever is in a portion of the leg portion of the T-shape opening.

11. A mower as set forth in claim 10, further comprising a manual pump connectable to the steering lever of the vehicle and configured to supply pressurized fluid to the hydraulic actuator in response to movement of the steering lever.

12. A mower as set forth in claim 11, wherein the manual pump is configured to be operated by the steering control lever when the steering control lever is moved within the T-shape opening.

13. A mower as set forth in claim 12, wherein the manual pump is configured to be operated by the steering control lever when the steering control lever is moved within the leg of the T-shape opening.

14. A mower as set forth in claim 11, wherein the manual pump and sensor are included in a housing mountable to the mower as a unit.

15. A parking brake system as set forth in claim 11, wherein the manual pump is a plunger pump.

16. A mower as set forth in claim 8, wherein the sensor is a switch having a first position and a second position, and the sensor is configured such that the first position or second position is associated with the steering control lever being in the park position.

17. A mower as set forth in claim 8, wherein the actuator is a hydraulic actuator coupled to a hydraulic circuit of the mower and configured to disengage the parking brake member when pressurized fluid is supplied thereto.

* * * * *